(12) United States Patent  
Kleinsasser

(10) Patent No.: US 7,598,463 B2  
(45) Date of Patent: Oct. 6, 2009

(54) ANIMAL SCALE

(75) Inventor: Jonathan Kleinsasser, Ste. Agathe (CA)

(73) Assignee: Crystal Spring Colony Farms Ltd., Manitoba (CA)

( * ) Notice: Subject to any disclaimer, the term of this patent is extended or adjusted under 35 U.S.C. 154(b) by 32 days.

(21) Appl. No.: 12/013,893

(22) Filed: Jan. 14, 2008

(65) Prior Publication Data  
US 2009/0178859 A1    Jul. 16, 2009

(51) Int. Cl.  
*G01G 21/28* (2006.01)

(52) U.S. Cl. .................. 177/133; 177/145; 177/155; 119/842

(58) Field of Classification Search .......... 177/133, 177/145, 155; 119/842  
See application file for complete search history.

(56) References Cited

U.S. PATENT DOCUMENTS

| | | | |
|---|---|---|---|
| 2,706,626 A * | 4/1955 | Reiser | 177/161 |
| 2,823,911 A * | 2/1958 | Murphy | 177/154 |
| 3,774,704 A | 11/1973 | Purcell | |
| 4,138,968 A * | 2/1979 | Ostermann | 119/842 |
| 4,470,471 A * | 9/1984 | Mills | 177/132 |
| 4,569,408 A | 2/1986 | Berns | |
| 4,850,441 A * | 7/1989 | Mosdal | 177/136 |
| 4,905,780 A | 3/1990 | Goff | |
| 5,612,515 A * | 3/1997 | Eisen | 177/126 |
| 5,734,128 A * | 3/1998 | Gades et al. | 177/244 |
| 6,239,711 B1 * | 5/2001 | Downey et al. | 340/666 |
| 6,805,078 B2 * | 10/2004 | Zimmerman et al. | 119/842 |
| 6,837,189 B2 | 1/2005 | Schick | |

FOREIGN PATENT DOCUMENTS

| | | |
|---|---|---|
| CA | 2512162 | 12/2004 |
| EP | WO 03/103380 | 12/2003 |

* cited by examiner

*Primary Examiner*—Randy W Gibson  
(74) *Attorney, Agent, or Firm*—Adrian D. Battison; Ade & Company Inc.

(57) ABSTRACT

A weigh scale and a sorter unit mounted at a front gate for guiding the animal after weighing when the animal emerges from the front gate is transported from pen to pen within a barn on ground wheels with the sorter unit being mounted so as to be movable from a deployed position to a retracted transport position by folding or sliding, in which a total length of the weigh scale and sorter unit is reduced relative to a total length thereof in the deployed position for maneuvering the weigh scale with sorter unit attached during transportation.

15 Claims, 7 Drawing Sheets

ND SCALE

This invention relates to an animal scale which is generally suitable for weighing hogs prior to sending the hogs to market.

BACKGROUND OF THE INVENTION

It is previously known in the raising and marketing of hogs that it is necessary to separate the hogs when they reach a predetermined market weight for transportation to market. For this reason a number of manufacturers have designed sorters which cause the hogs to pass through one at a time for weighing on a scale within the hog sorter which then activates a gate to select a path for the hog either to a market pen or to a retaining pen depending upon the weight of the hog.

A number of different designs of sorters of this type are readily available. Some utilize a system in which the hogs pass through on a periodic basis, generally to a feeding station. Others use other systems where the hog may be required to backup out of the containment cage or pen into which the hog enters for the weighing action.

In the scale, commonly the hog is marked with a paint marker so as to identify those hogs which weigh within a required range.

Currently sorters are used mostly in food court systems where the hogs have to go through to get feed and in other cases you chase the pigs through every so often to weight and sort them.

One arrangement of this type is shown in U.S. Pat. No. 6,837,189 (Schick) issued Jan. 4, 2005. This provides an arrangement in which animals are sorted between light and heavy into two separate pens using a sorting scale.

Also published International application WO03/103380 (Thibault) assigned to Osborne Industries Inc. and published Dec. 18, 2003 discloses a system of dividing animals into heavy weight pen and a lightweight pen using a sorting scale.

Arrangements of this type are suitable where the barn can be divided into pens of sufficient size that the food courts system is viable.

There are however currently thousands of barns in operation that have between 25 and 45 pigs per pen and can not easily be converted to food court systems or large group pens for automatic weighing and sorting. In those barns operators often use a stationary sorter and bring the pigs out of the pen to the sorter and then return at least all the light pigs back to their pen. This is both labour intensive and hard on the pigs because of the length of the barns.

It is known to move a simple weigh scale from pen to pen since the scale itself is relatively small. This however requires manual management of the animals to direct them into and away form the scale after the weighing is complete which is highly labor intensive.

A sorter of the type with which the present invention is concerned is shown in published Canadian Application No. 2,512,162 filed Dec. 16, 2004 and entitled APPARATUS FOR APPLYING A TATTOO TO A HOG PRIOR TO MARKET and assigned to the present Assignees. The disclosure of this application is incorporated herein by reference for any details of the sorter which may be omitted from this application.

A portable hydraulic livestock scale is shown in U.S. Pat. No. 3,774,704 (Purcell) issued Nov. 27, 1973 which is collapsible by removing certain components such as ramp pieces.

In U.S. Pat. No. 4,905,780 (Goff) issued Mar. 6, 1990 is shown a livestock scale mounted on a large trailer so that the scale can be moved from site to site. However it is clear that this trailer is not designed for movement within the narrow confines of a barn.

In U.S. Pat. No. 4,569,408 (Berns) issued Feb. 11, 1986 is shown a livestock scale where the scale itself is mounted on wheels for transportation within a barn. However this scale does not include any sorting arrangement and is primarily designed for use with piglets in a basket.

SUMMARY OF THE INVENTION

It is one object of the invention to provide an apparatus arranged to apply a tattoo mark to a hog prior to transportation to market.

According to one aspect of the invention there is provided an apparatus for sorting livestock comprising:

a base frame;

a weigh scale mounted on the base frame;

the weigh scale including two side walls, a rear gate and a front gate arranged with the gates closed to confine the animal within the weigh scale;

an operating device including a control unit for actuating movement of the gates so as to allow entry of an animal through the rear gate onto the weigh scale and to allow release of the animal when weighed through the front gate;

a platform within the weigh scale on which the animal when confined stands with the platform being connected to a weighing device for detecting the weight of the animal when standing on the platform;

a sorter unit mounted at the front gate for guiding the animal after weighing when the animal emerges from the front gate;

the sorter unit including at least one gate, a mounting assembly for carrying the gate so as to be carried with the weigh scale on the base frame and an actuating device for moving the at least one gate;

and ground wheels for carrying the base frame with the weigh scale and the sorter unit carried thereon during transportation to different locations for sorting animals at a selected location;

the sorter unit being mounted so as to be movable from a deployed position to a retracted transport position, in which a total length of the weigh scale and sorter unit is reduced relative to a total length thereof in the deployed position for maneuvering the weigh scale with sorter unit attached during transportation.

Preferably the sorter unit includes two gates each arranged to extend generally parallel along a respective side of the weigh scale.

Preferably the sorter unit includes a frame within which said at least one gate is mounted and wherein the frame is moved relative to the weigh scale during movement from the deployed position to the retracted position.

Preferably the frame is mounted such that it remains attached during the movement.

Preferably the frame is rigid and remains in a common shape during the movement so that it is readily available and immediately deployed when moved to the deployed position.

In one arrangement, the frame is mounted such that it pivots onto a top of the weigh scale in the retracted position.

In another arrangement, the frame is mounted such that it has sides which slide along sides of the weigh scale in the retracted position.

Preferably in this arrangement the frame is mounted such that it slides and lifts during the movement.

In another possible arrangement, the sorter unit includes two gates each of which folds inwardly toward the front gate in the retracted position.

Preferably in this arrangement each gate is pivotally mounted on the weigh scale at a respective side of the front gate and wherein the actuating device is arranged to pivot both gates simultaneously toward a selected side of the front gate to direct the emerging animals to the selected side.

Preferably the ground wheels include main wheels at one end of the frame and steerable wheels at the other end of the frame.

Preferably the main wheels are at the front gate and the sorter unit.

Preferably the main wheels are driven.

Preferably the main wheels can be raised to a retracted position to drop the base frame onto the ground.

Preferably the steerable wheels, which may be castor wheels, are arranged relative to frame support members that raising the main wheels acts to tilt the base frame to drop the base frame on to the support members without raising the steerable wheels.

Thus in the present arrangement, the sorter and scale are brought to the pen or into the pen. In one mode of use the sorter is moved from pen to pen along an alleyway and the pigs are chased out of the pen, through the sorter and into an empty pen. In a second mode of use, the sorter is moved into the pen and either the market ready pigs are just marked for later sorting or they are sorted out into the alley.

Thus the device disclosed herein provides a completely portable sorter and in some cases it will be used to weigh and sort the heavy pigs out of the pen into the alley way. It is also possible to only weigh and mark the pigs and leave them in the same pen.

To make the system very user friendly there may be provided an electric (battery powered) lift for the rear drive larger wheels as described hereinafter. There is also provided a set of swivel or castor wheels on one end so the scale is very easy to move around. The swivel wheels are preferably mounted at such a height relative to the lifting rear wheels such that when the sorter is down on the floor the swivel wheels also do not touch the floor. As the big main wheels are lowered with the actuator, the swivel wheels also touch the floor. Typically the end of the sorter where the swivel wheels are located is heavier so it wants to tilt in that direction.

The complete unit is, without the folding action described herein, too long to turn into a pen from a narrow alleyway. To make it shorter the sorter section is folded end up or inwardly and out of the way. Once the scale is moved into the pen the sorter is swung it down or returned to its working position so that the device can be used to sort heavy pigs out into the alley way and light pigs are retained in the same pen. In one mode of use there is a movable divider in the pen that separates the pigs that have not gone through the scale yet.

Another option, where the sorter is folded upwardly on to the top of the weigh scale, is to leave the sorter section in the stored position and out of the way and the device can be used by chasing them through the scale while returning all the pigs in the same pen but while marking or painting the ones that are heavy enough for market.

These actions can all be carried out easily with one man if the sorter, as described herein, is easy to move.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
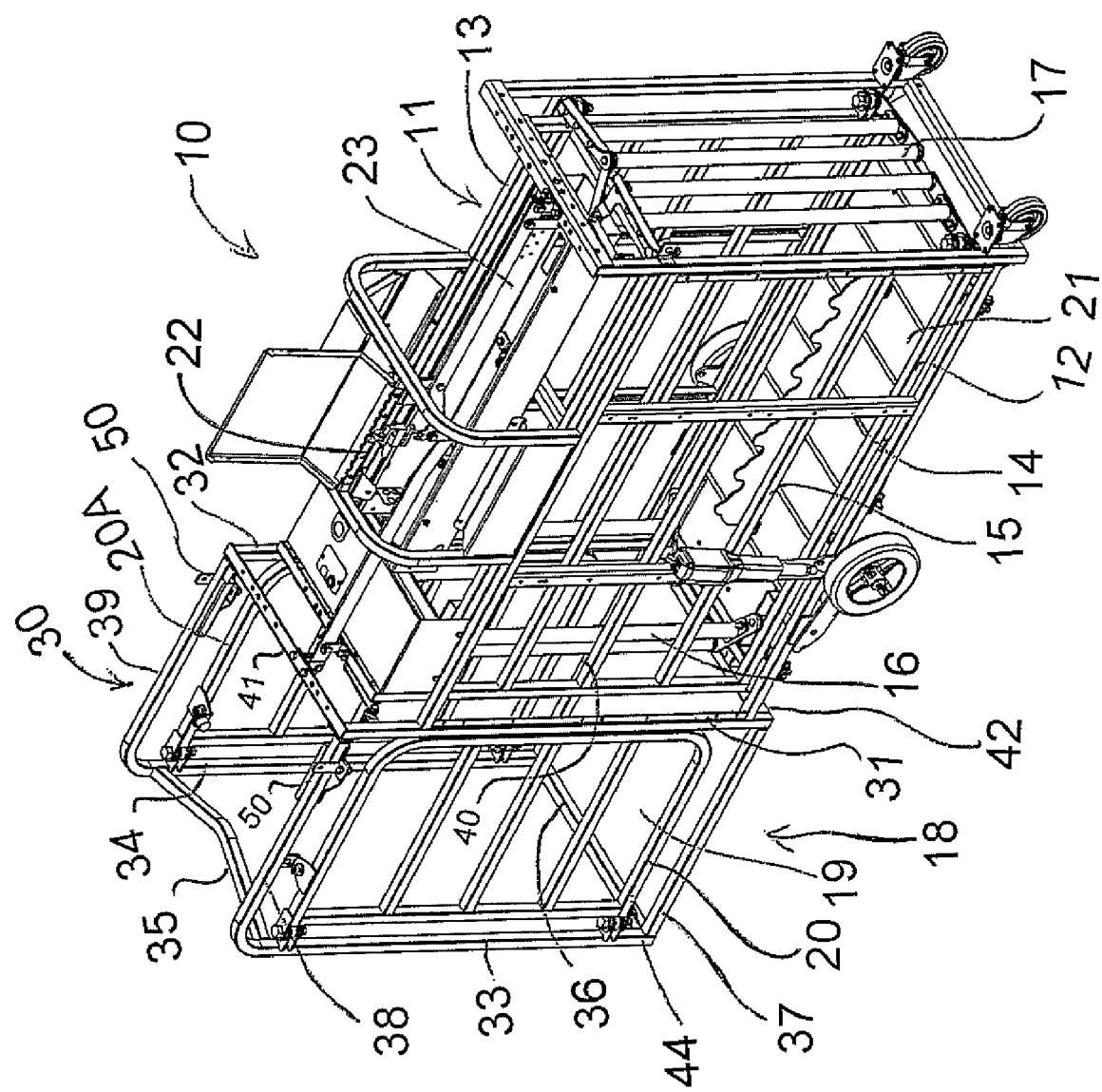
FIG. 1 is an isometric view of a first embodiment of hog weigh scale and sorter according to the present invention showing the sorter in the deployed position.
Figure 4:
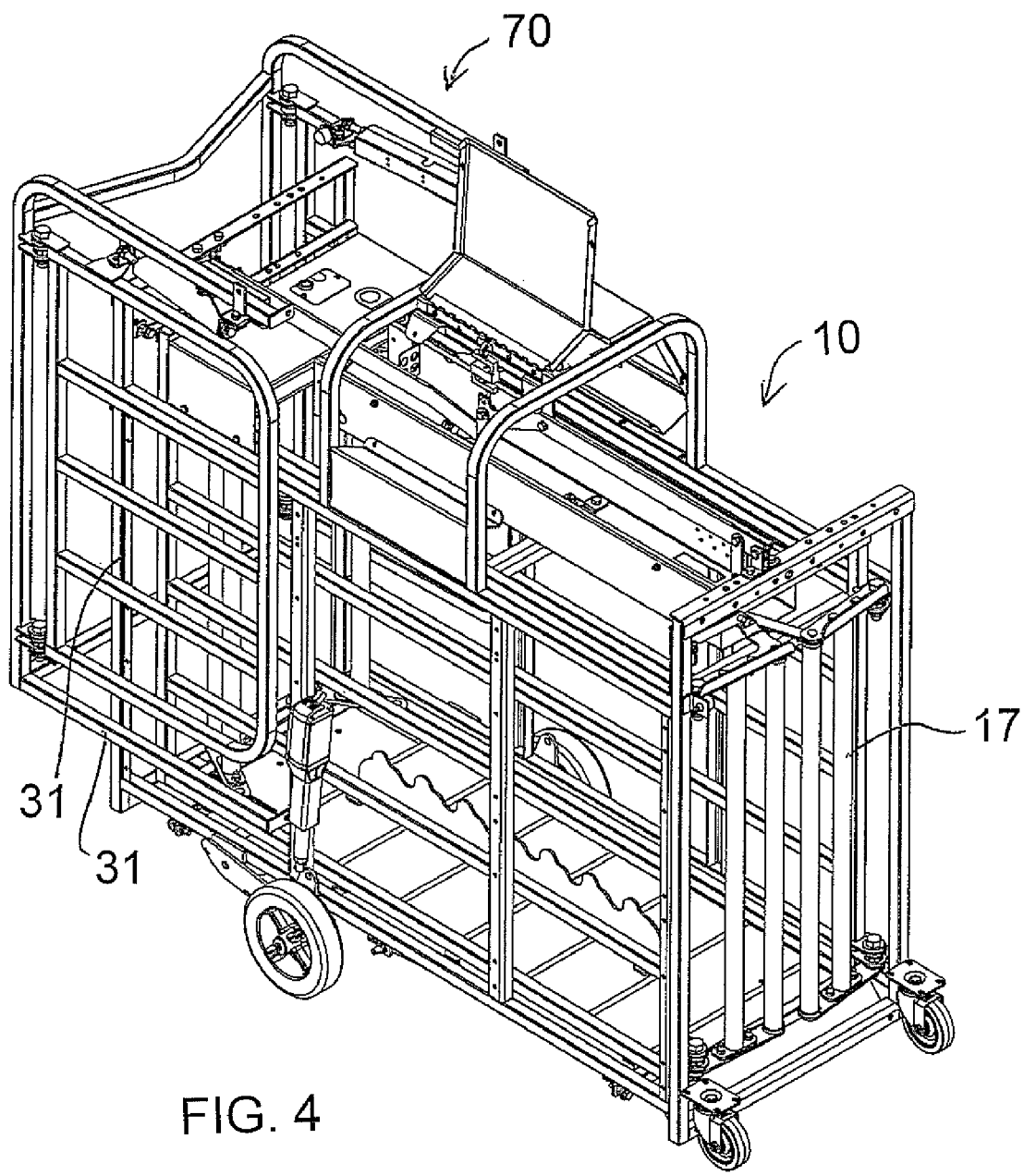
FIG. 4 is an isometric view of a second embodiment of hog weigh scale and sorter according to the present invention showing the sorter in the retracted position.
Figure 6:
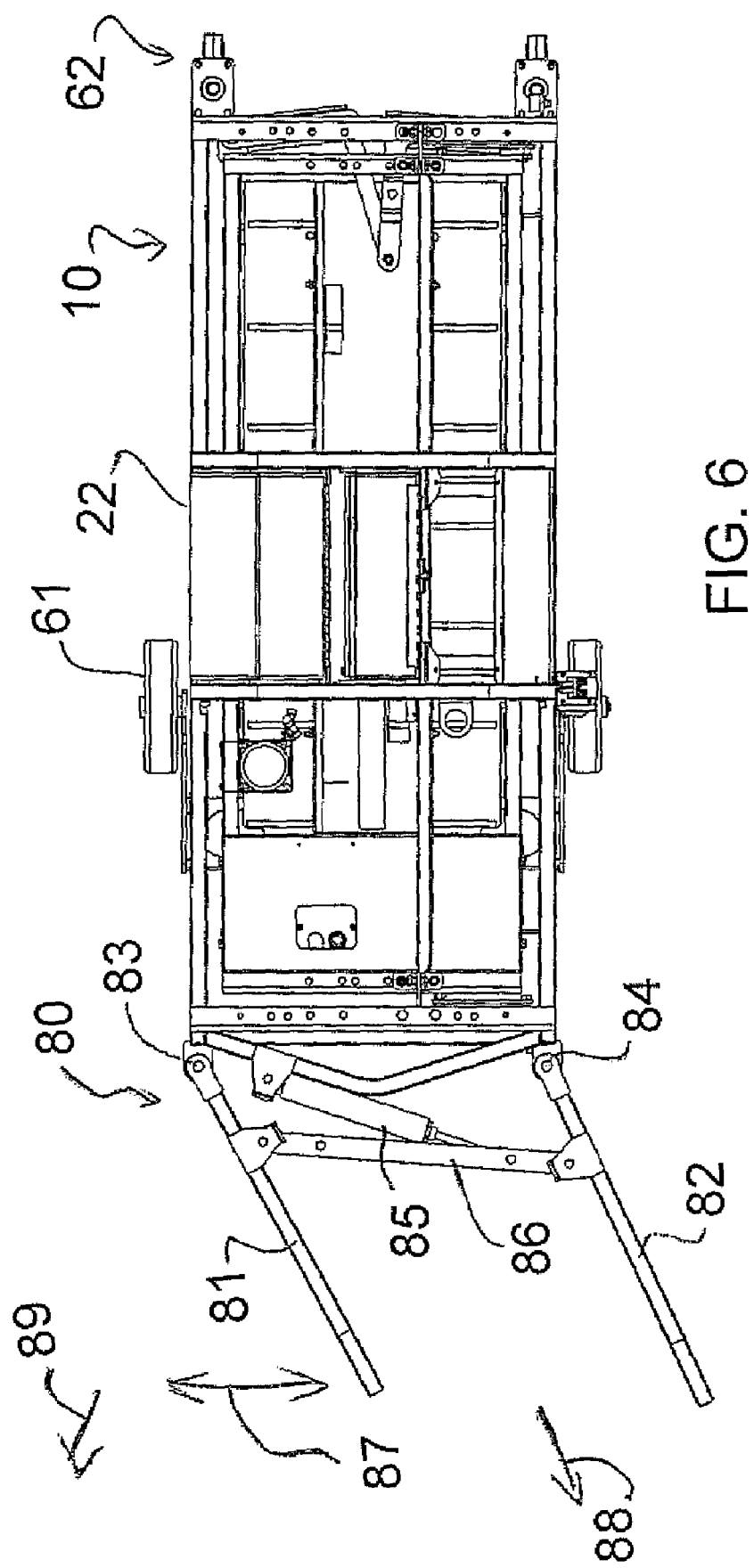
FIG. 6 is a top plan view of a third embodiment of hog weigh scale and sorter according to the present invention showing the sorter in the deployed position.

In FIGS. 1, 4 and 6 is shown a hog weigh scale and sorter 10 which includes a confining container or cage 11 for receiving an animal to be sorted. The confining cage is defined by side walls 12 and 13 which are formed by uprights 14 and longitudinal rails 15 so as to form a closed wall along a respective side of the animal to be weighed. The side walls may be formed of sheet material fully enclosing the animal to prevent vision to the sides or may be formed simply from rails as required. In either event the side walls are sufficiently closed to prevent the animal from escaping to the sides. At the front, the container is closed by a front gate 16 and at the rear the container is closed by a rear gate 17. Around the sides and the front of the container is provided a sorting enclosure 18 which defines a front area 19 with a sorting panels or gates 20, 20A which can be moved depending upon the weight of the animal so that the animal is deflected to one side or the other into a market pen or a holding pen as required. At the bottom of the container 11 is provided a weigh pan 21 on which the animal stands while contained so as to measure the weight of the animal.

A control unit 22 is provided for controlling the gates 16 and 17 and the sorting panels 20, 20A to confine the animal, and to allow the escape of the animal when weighed in the required direction.

Across the top of the sorting container 18 is provided a super-structure 23 formed by cross rails and longitudinal rails which maintain the integrity of the structure and prevent the animal from escaping or attempting to escape over the side walls or over the gates.

The gates are actuated by cylinders controlled by the control unit 22 which supplies air to the double acting cylinders to open and close the gates as required. The control unit is arranged to control the gates so that they is closed when the animal enters to prevent further animals from entering until the first animal is weighed and sorted.

The control unit can be used to record data concerning particular animals or statistically concerning all the animals passing through so as to provide data to the management concerning average weight gain, expected market date and other relevant data which can be obtained from repeated weighing of the animals as they pass through the sorter.

The above construction is well known and many devices of this type have been sold.

The construction of the confining cage is shown only schematically since many different designs of such cage can be provided including posts and rails or a framework and panels as is shown. Thus in the embodiment shown the confining cage is formed by four vertical posts at the corners together with side panels which form closed sides up to the height of the posts which in general is sufficient to retain the animal and deter the animal from attempting to climb out of the confining cage.

The length of the confining cage is sufficient to receive the animal so that it is relatively closely located within the cage with its feet on the horizontal pan forming the weigh scale 21 and its rear end up against or adjacent the rear gate 17.

The sorting gates can be of various arrangements as required to provide different sorting arrangements with two or more discharge direction depending on requirements. In some cases a single gate can be used. In most cases two gates are provided which are pivoted so as to move to one side or the other.

The sorter unit 18 as shown in FIGS. 1 and 4 includes a frame 30 which is generally rectangular with two vertical posts 31 and 32 at the front gate 16. Two further vertical posts 33 and 34 are located to define a discharge opening spaced from the gate 16 and parallel to the plane of the gate 16. The posts 33 and 34 are connected by top and bottom cross rails 35 and 36. The posts 33 and 31 are connected by top and bottom cross rails 37 and 38. The posts 34 and 32 are connected by top and bottom cross rails 39 and 40. The posts 31 and 32 are connected by top and bottom cross rails 41 and 42. This forms a rigid frame. The two gates 20 and 20A are mounted respectively in the side planes of the frame and pivot on hinges at the posts 33 and 34. In this arrangement therefore, the animal can pass though one side opening in the plane of the posts 33 and 31 by moving the gate 20 to a position at the posts 33 and 34, the animal can pass though the other side opening in the plane of the posts 34 and 32 by moving the gate 20A to a position at the posts 33 and 34 or the animal can pass though the end opening in the plane of the posts 33 and 34 by moving the gates 20 and 20A to the sides as shown.

Figure 2:
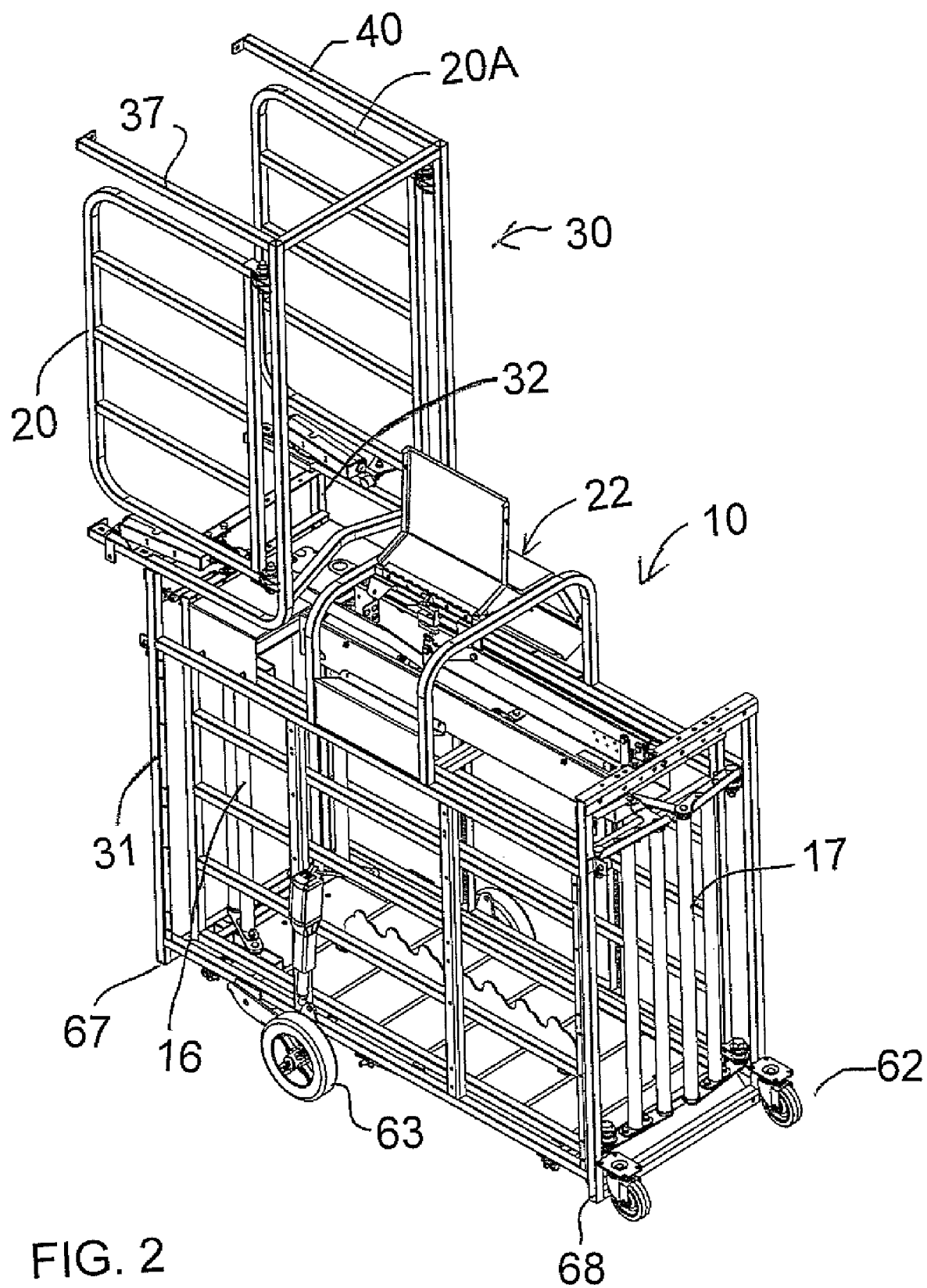
FIG. 2 is an isometric view of the hog weigh scale and sorter of FIG. 1 showing the sorter in the folded or retracted position.
Figure 3:
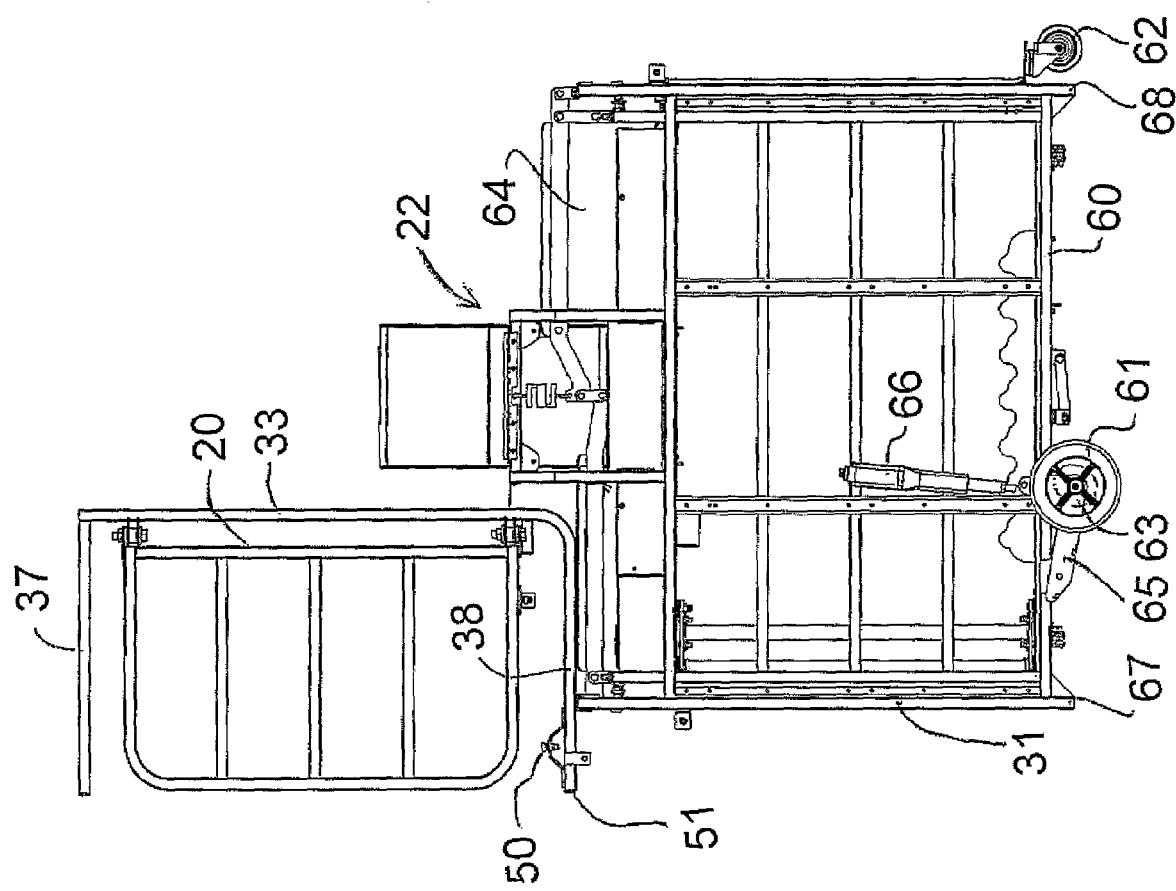
FIG. 3 is side elevational view of the hog weigh scale and sorter of FIG. 1 showing the sorter in the folded or retracted position.

In FIGS. 2 and 3, the frame 30 is shown in a retracted position which reduces the overall length of the scale and sorter unit. The frame 30 is moved relative to the weigh scale during movement from the deployed position to the retracted position.

The frame 30 is mounted such that it remains attached during the movement.

Thus as best sown in FIG. 3, the posts 31 and 32 and their cross rails 41 and 42 remain fixed at the gate 16. The rails 37 and 40 are separated from the posts 31 and 32. The top rails 38 and 39 include a hinge 50 which allows the posts 33 and 34 and the gates 20 and 20A to rotate so that the pivoting part of the frame moves through 180 degrees to stand in an inverted position on top of the frame of the weigh scale.

This reduces the length of the unit because the rear most point 51 is closer to the front of the weigh scale than the rearmost point of the deployed frame as defined by the posts 33 and 34.

Thus the frame is mounted such that at least part of it pivots onto a top of the weigh scale in the retracted position. The positioning f the hinge at a location part way along the rails 38 and 39 locates the frame away from the control unit 22 so that it can be accommodated on top of the weigh scale without interfering with its normal function.

The weigh scale is mounted on a base frame 60 which is carried on ground wheels including main wheels 61 at one end of the frame 60 and steerable or castor wheels 62 at the other end of the frame. The main wheels 61 are driven by an electric motor schematically indicated at 63 receiving power from a battery 64 under control of a manually operable switch (not shown). The main wheels 62 are located at the front gate and the sorter unit. The main wheels can be raised on mounting levers 65 by actuating cylinders 66 to a retracted position to drop the base frame onto the ground where it is supported by legs or ground supports 67 and 68.

The steerable or castor wheels are arranged adjacent to the frame support members or legs 68 and only slightly below the legs 68 such that raising the main wheels acts to tilt the base frame 60 to drop the base frame on to the support members 67 and 68 without raising the castor wheels.

Figure 5:
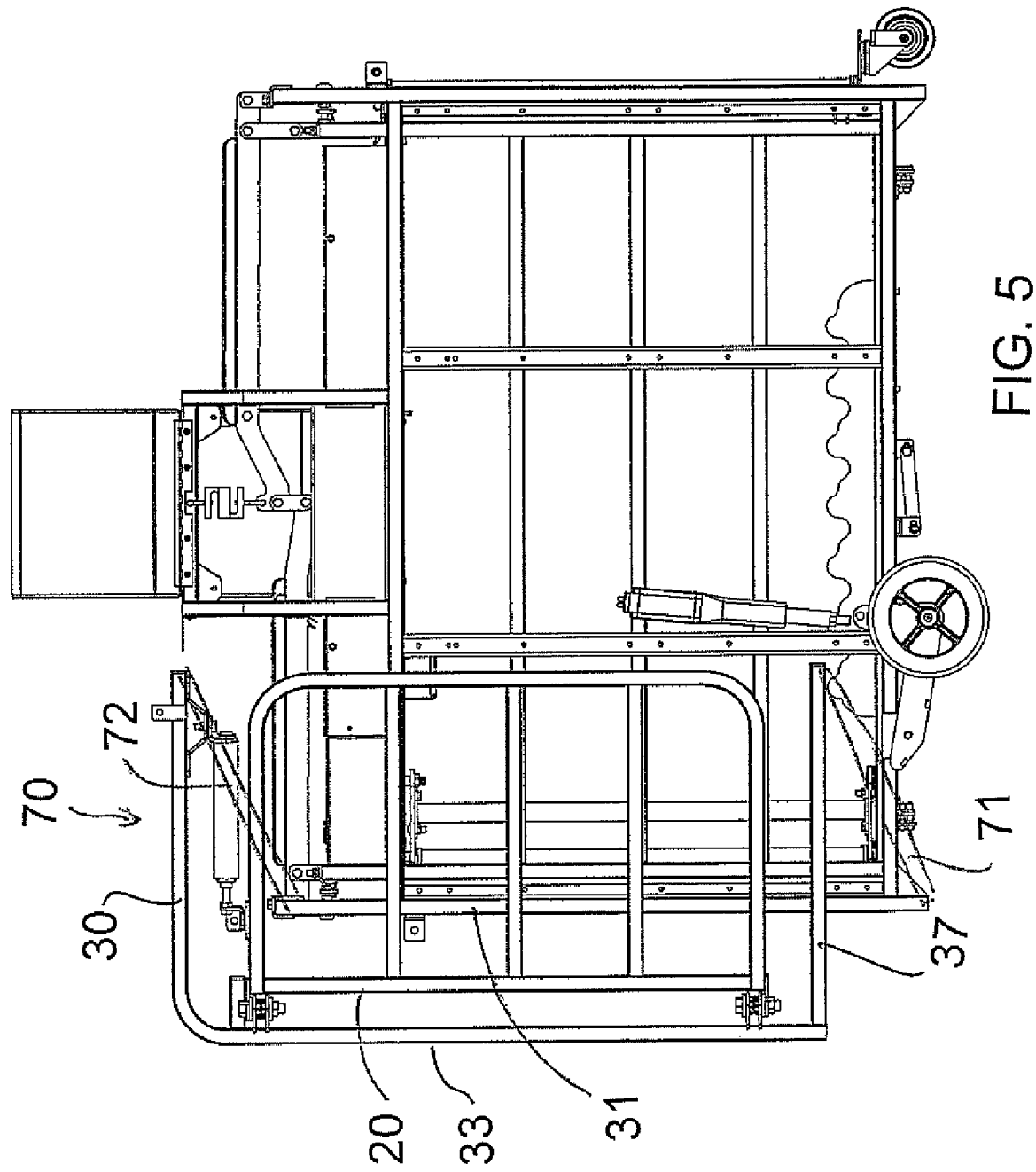
FIG. 5 is a side elevational view of the hog weigh scale and sorter of FIG. 4 showing the sorter in the retracted position.

In FIGS. 4 and 5 is shown another arrangement where the sorter frame 70 the frame is mounted on a linkage schematically indicated at 71 and 72 such that the rear movable part moves forwardly and upwardly relative to the posts 31 and 32 which remain fixed. In this arrangement the sides of the frame are slightly wider than the weigh scale so that it has sides which slide along the outsides of the weigh scale into the retracted position.

The linkage 71, 72 is arranged such that the movable part of the frame slides and lifts during the movement. In this way the frame moves to a retracted position but does not move as high as it does in the folding action thus avoiding a situation where the resultant height is greater than available doorways. However in this embodiment the sorter frame remains in front of the front gate thus preventing the use of the weigh scale with the sorter unit in the retracted position simply as a scale without any sorting action.

Figure 7:
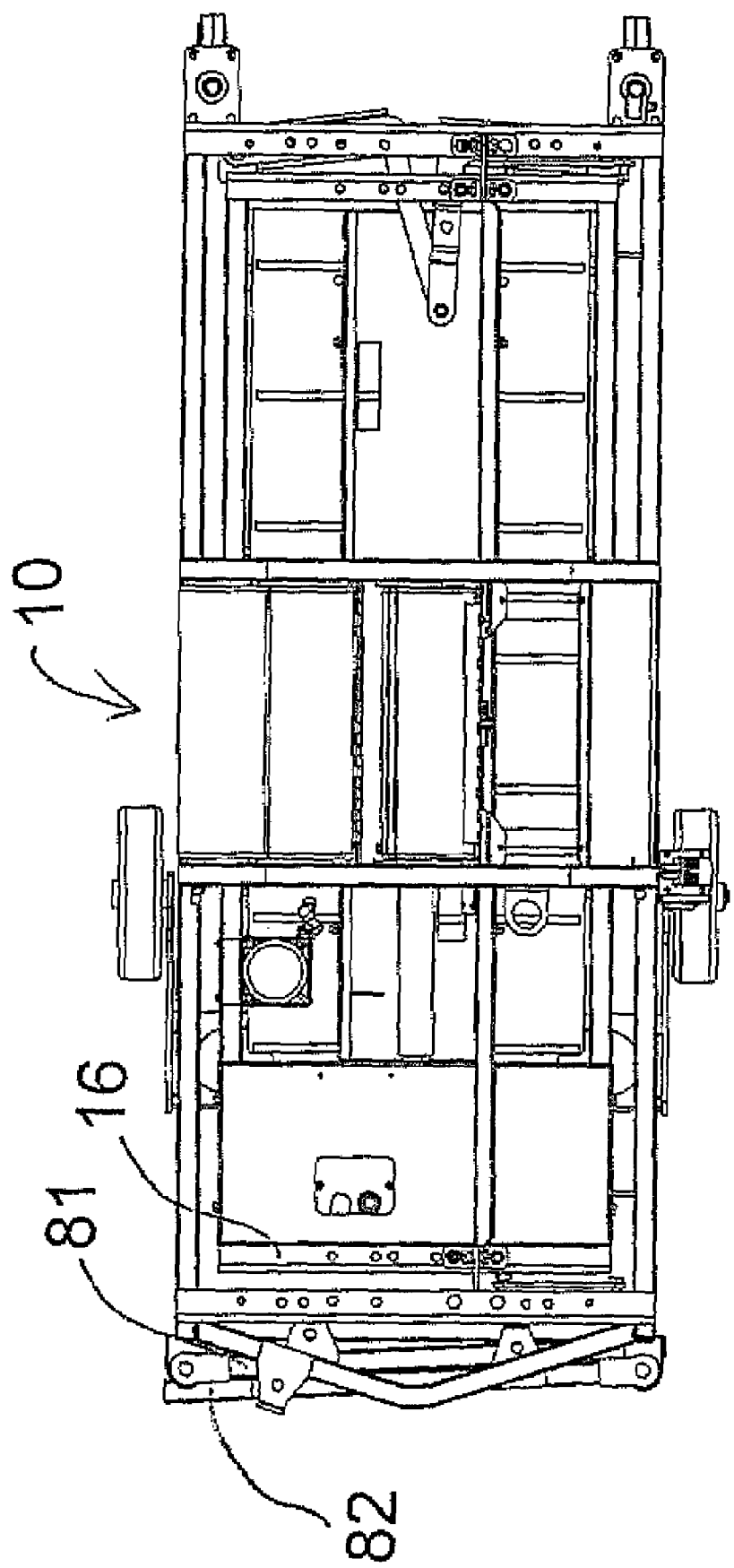
FIG. 7 is a top plan view of the hog weigh scale and sorter of FIG. 6 showing the sorter in the retracted position.

A further arrangement is shown in FIGS. 6 and 7 where the sorter unit 80 has no frame but includes two gates 81 and 82 each of which extends rearwardly in the deployed position but folds inwardly toward the front gate 16 in the retracted position.

Each gate is pivotally mounted on the weigh scale on a hinge 83, 84 at a respective side of the front gate 16 and an actuating device 85 is arranged to pivot both gates simultaneously connected by a link 86 toward a selected side 87 of the front gate 16 to direct the emerging animals to the selected side 88 or 89. In this arrangement therefore the sorter unit is very simple and is moved to the retracted position by folding of the gates rather than by movement of a supporting frame.

Since various modifications can be made in my invention as herein above described, and many apparently widely different embodiments of same made within the spirit and scope of the Claims without department from such spirit and scope, it is intended that all matter contained in the accompanying specification shall be interpreted as illustrative only and not in a limiting sense.

The invention claimed is:

1. Apparatus for sorting livestock comprising:

a base frame;

a weigh scale mounted on the base frame;

the weigh scale including two side walls, a rear opening and a front opening arranged with the openings closed to confine the animal within the weigh scale;

an operating device including a control unit for actuating movement of gates so as to allow entry of an animal through the rear opening onto the weigh scale and to allow release of the animal when weighed through the front opening;

a platform within the weigh scale on which the animal when confined stands with the platform being connected to a weighing device for detecting the weight of the animal when standing on the platform;

a sorter unit mounted so as to project forwardly from the front opening in an operating position thereof for guiding the animal after weighing when the animal emerges from the front opening;

the sorter unit including at least one sorter gate arranged for guiding the animal into a selected one of a plurality of different directions, an actuating device for moving said at least one sorter gate, and a mounting assembly for carrying the sorter unit and the at least one sorter gate so as to be carried with the weigh scale on the base frame;

and ground wheels for carrying the base frame with the weigh scale and the sorter unit carried thereon during transportation to different locations for sorting animals at a selected location;

the sorter unit being mounted so as to be movable from the operating position to a retracted transport position;

the sorter unit being arranged such that in the retracted transport position a total length of the weigh scale and the sorter unit is reduced relative to a total length thereof in the operating position for maneuvering the weigh scale and the sorter unit during transportation;

the sorter unit being arranged such that in the retracted transport position the sorter unit is attached to the weigh scale for transportation therewith.

2. The apparatus according to claim 1 wherein the sorter unit includes two gates each arranged to extend generally parallel along a respective side of the weigh scale.

3. The apparatus according to claim 1 wherein the sorter unit includes a sorter frame within which said at least one gate is mounted and wherein the sorter frame is moved relative to the weigh scale during movement from the operating position to the retracted position.

4. The apparatus according to claim 3 wherein the sorter frame is mounted such that it remains attached during the movement.

5. The apparatus according to claim 3 wherein the sorter frame is rigid and remains in a common shape during the movement.

6. The apparatus according to claim 5 wherein the sorter frame is mounted such that it pivots onto a top of the weigh scale in the retracted position.

7. The apparatus according to claim 5 wherein the sorter frame is mounted such that it has sides which slide along sides of the weigh scale in the retracted position.

8. The apparatus according to claim 7 wherein the sorter frame is mounted such that it slides and lifts during the movement.

9. The apparatus according to claim 1 wherein the sorter unit includes two sorter gates each of which folds inwardly toward the front opening in the retracted position.

10. The apparatus according to claim 9 wherein each sorter gate is pivotally mounted on the weigh scale at a respective side of the front opening and wherein the actuating device is arranged to pivot both sorter gates simultaneously toward a selected side of the front opening to direct the emerging animals to the selected side.

11. The apparatus according to claim 1 wherein the ground wheels include main wheels at one end of the base frame and steerable wheels at the other end of the base frame.

12. The apparatus according to claim 11 wherein the main wheels are at the end of the base frame adjacent the front opening.

13. The apparatus according to claim 11 wherein the main wheels are driven.

14. The apparatus according to claim 11 wherein the main wheels can be raised to a retracted position to drop the base frame onto the ground.

15. The apparatus according to claim 14 wherein the steerable wheels are arranged relative to frame support members that raising the main wheels acts to tilt the base frame to drop the base frame on to the frame support members without raising the steerable wheels.

* * * * *